US006558561B2

(12) United States Patent
Sasaki (10) Patent No.: US 6,558,561 B2
(45) Date of Patent: May 6, 2003

(54) THIN FILM MAGNETIC HEAD AND METHOD OF MANUFACTURING THE SAME (75) Inventor: Yoshitaka Sasaki, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 10/060,335

(22) Filed: Feb. 1, 2002

(65) Prior Publication Data
US 2002/0113036 A1 Aug. 22, 2002

Related U.S. Application Data (62) Division of application No. 09/282,183, filed on Mar. 31, 1999, now Pat. No. 6,388,845.

(30) Foreign Application Priority Data
Apr. 2, 1998 (JP) .............................................. 10-89806

(51) Int. Cl.⁷ ........................... B44C 1/22; G11B 5/127; H04R 31/00
(52) U.S. Cl. .................. 216/22; 29/603.14; 29/603.15; 438/3
(58) Field of Search .............................. 216/22, 51, 67, 216/72, 75, 77, 58; 360/126, 125, 123, 121, 317, 319, 113, 110, 324; 29/603.14, 603.15, 603.18; 438/3

(56) References Cited

U.S. PATENT DOCUMENTS 5,438,747 A 8/1995 Krounbi et al.

(List continued on next page.)

FOREIGN PATENT DOCUMENTS

| JP | A-60-10409 | 1/1985 |
| JP | 61-178710 | 8/1986 |

(List continued on next page.)

OTHER PUBLICATIONS

U.S. patent application Ser. No. 09/220,703, Yoshitaka Sasaki, filed Dec. 1998.

Primary Examiner—Gregory Mills
Assistant Examiner—Roberts P Culbert
(74) Attorney, Agent, or Firm—Oliff & Berridge, PLC (57) ABSTRACT A thin film magnetic head having a particularly short throat height and a fine pole portion with no magnetic saturation and a small magnetic flux leakage is manufactured on a mass scale in an efficient and speedy manner as follows. After forming a lower shield for a magnetoresistive type thin film magnetic head on a substrate, a magnetoresistive layer embedded in a shield gap layer is formed, a first magnetoresistive layer constituting an upper shield for the magnetoresistive type thin film magnetic head as well as a lower pole of an inductive type thin film magnetic head is formed, a recess is formed in its surface, an insulating layer is embedded in the recess, and a surface is flattened. On the thus flattened surface, is formed a write gap layer, and a second magnetic layer constituting a pole chip is formed into a desired pattern. A rear edge of said second magnetic layer is extended inwardly beyond an edge of the recess opposing to an air bearing surface. On the write gap layer, first and second layer thin film coils are formed on the write gap layer such that the thin film coils are supported by photoresist insulating layers, a third magnetic layer is formed such that a front end of the third magnetic layer is retarded from the air bearing surface and the third magnetic layer is coupled with the first magnetic layer at a portion remote from the air bearing surface, and then an overcoat layer is formed on a whole surface. A position of said edge of the recess formed in the first magnetic layer opposed to the air bearing surface is not deviated during the manufacturing process and the air bearing surface is polished while said position is used as a throat height zero reference position.

11 Claims, 10 Drawing Sheets

U.S. PATENT DOCUMENTS

| | | |
|---|---|---|
| 5,452,164 A | 9/1995 | Cole et al. |
| 5,734,536 A | 3/1998 | Shouji et al. |
| 5,793,578 A | 8/1998 | Heim |
| 5,805,391 A | 9/1998 | Change et al. |
| 5,828,533 A | 10/1998 | Chashi et al. |
| 6,104,576 A | 8/2000 | Santini |

FOREIGN PATENT DOCUMENTS

| | | |
|---|---|---|
| JP | A-62-245509 | 10/1987 |
| JP | 63-58610 | 3/1988 |
| JP | 2-54412 | 2/1990 |
| JP | 2-247809 | 10/1990 |
| JP | 2-302916 | 12/1990 |
| JP | 4-285711 | 10/1992 |
| JP | 5-20639 | 1/1993 |
| JP | 5-89430 | 4/1993 |
| JP | 6-314413 | 11/1994 |
| JP | A-7-262519 | 10/1995 |
| JP | 11-213329 | 8/1999 |

THIN FILM MAGNETIC HEAD AND METHOD OF MANUFACTURING THE SAME

CROSS REFERENCE TO RELATED APPLICATION

This is a division of application Ser. No. 09/282,183, Mar. 31, 1999, now U.S. Pat No. 6,388,845

BACKGROUND OF THE INVENTION

1. Field of the Invention

The present invention relates to a thin film magnetic head including a inductive type writing thin film magnetic head and a method of manufacturing the same, and more particularly relates to a combination type thin film magnetic head constructed by stacking an inductive type writing thin film magnetic head and a magneto-resistive type reading thin film magnetic head on a surface of a substrate and a method of manufacturing such a combination type thin film magnetic head.

2. Description of the Related Art

Recently a surface recording density of a hard disc device has been improved, and it has been required to develop a thin film magnetic head having an improved performance accordingly. A combination type thin film magnetic head is constructed by stacking an inductive type thin film magnetic head intended for writing and a magnetoresistive type thin film magnetic head intended for reading on a substrate, and has been practically used. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times.

In the present specification, such AMR and GMR elements are termed as a magnetoresistive reproducing element or simply as MR reproducing element.

By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than ten gigabytes.

A height of a magnetoresistive reproducing element, i.e. MR Height(MRH) is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type writing thin film magnetic head is a throat height (TH). This throat height TH is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

Therefore, in order to improve the performance of the combination type thin film magnetic head having the inductive type recording head and magnetoresistive reading head stacked one on the other, it is very important to make the performance of the recording head and the performance of the reading head to be balanced with each other.

Figure 10:
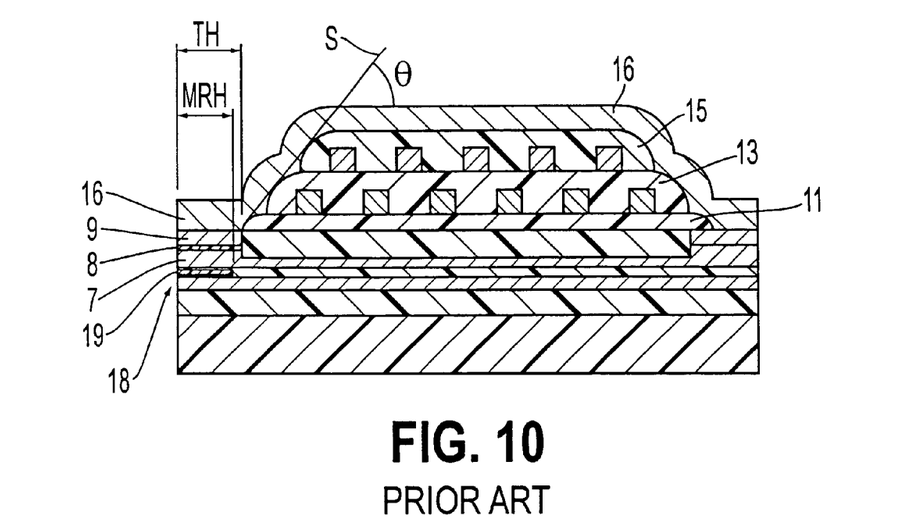
Figure 11:
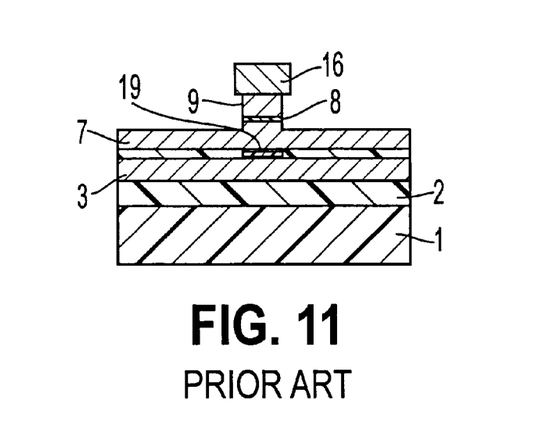
FIG. 11 is a cross sectional view illustrating a pole portion of the known combination type thin film magnetic head.
Figure 12:
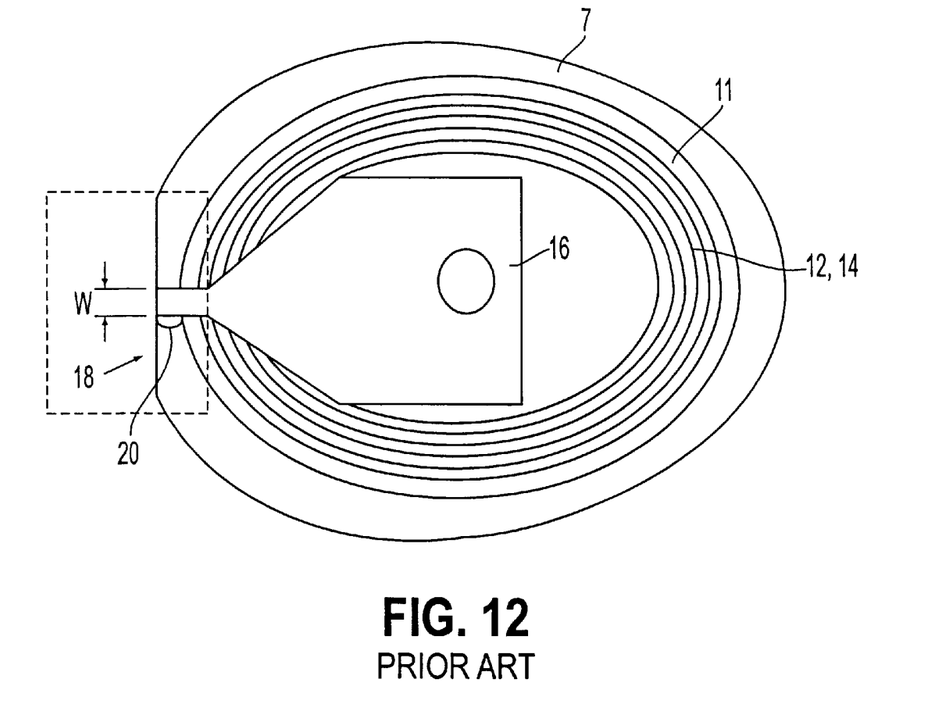
FIG. 12 is a plan view depicting the known combination type thin film magnetic head.

FIGS. 1–9 show successive steps of a method of manufacturing a conventional standard thin film magnetic head. In these drawings, A represents a cross sectional view cut along a plane perpendicular to the air bearing surface and B denotes a cross sectional view of a pole portion cut along a plane parallel to the air bearing surface. FIGS. 10–12 are cross sectional and plan views showing a finally manufactured completed thin film magnetic head. It should be noted that the thin film magnetic head is of a combination type in which the inductive type writing thin film magnetic head and reproducing MR element are stacked one on the other.

Figure 1A:
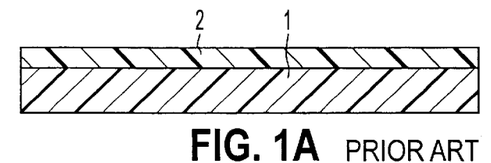
Figure 1B:
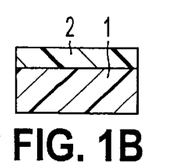

First of all, as shown in FIG. 1, an alumina ($Al_2O_3$) insulating layer 2 having a thickness of about 5–10 µm is deposited on a substance 1 made of, for instance AlTiC.

Figure 2A:
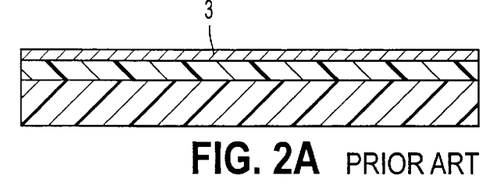
Figure 2B:
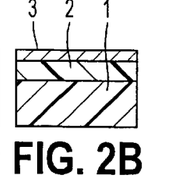

Next, as shown in FIG. 2, a first magnetic layer 3 constituting a bottom shield which protects the MR reproduction element of the reproducing head from the influence of an external magnetic field, is formed with a thickness of 3 µm.

Figure 3A:
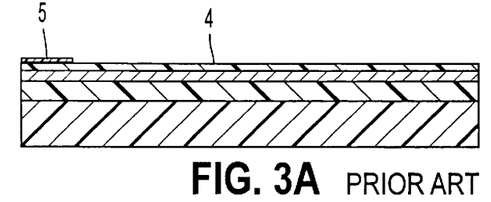
Figure 3B:
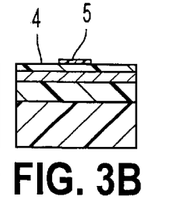

Then, as shown in FIG. 3, after depositing an alumina insulating layer 4 of thickness 100–150 nm by sputtering, a magnetoresistive layer 5 made of a material having the magnetoresistive effect and constituting the MR reproduction element is formed with a thickness not larger than ten nano meters, and is then shaped into a given pattern by the highly precise mask alignment.

Figure 4A:
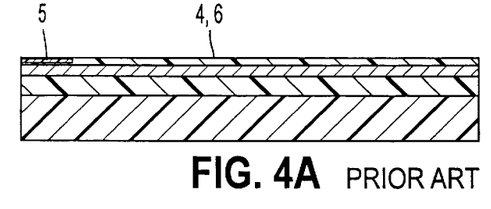
Figure 4B:
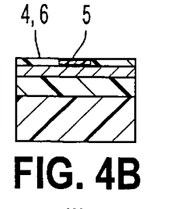

Then, as shown in the FIG. 4, an insulating layer 6 is formed again such that the magnetoresistive layer 5 is embedded within the insulating layers 4 and 6.

Figure 5A:
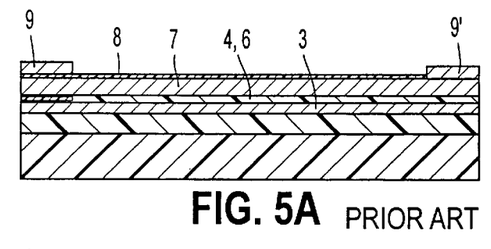
Figure 5B:
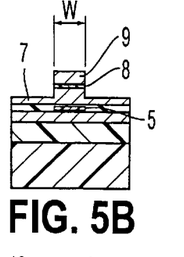

Next, as shown in the FIG. 5, a second magnetic layer 7 made of a permalloy is formed with a thickness of 3 µm. This second magnetic layer 7 has not only the function of the upper shield layer which magnetically shields the MR reproduction element together with the above described first magnetic layer 3, but also has the function of one of poles of the writing thin film magnetic head.

Then, on the second magnetic layer 7, is formed a write gap layer 8 made of a non-magnetic material such as alumina and having a thickness of about 200 nm, and then after forming a magnetic layer made of a magnetic material having a high saturation magnetic flux density such as a permalloy (Ni:50 wt %, Fe:50 wt %) and an iron nitride (FeN), this magnetic layer is shaped into a desired pattern by means of the highly precise mask alignment to constitute a pole chip 9. A track width is determined by a width W of the pole chip 9. Therefore, in order to attain a higher surface recording density, this width W should be made as small as possible.

During the above process, it is preferable to form a dummy pattern 9' which will connect the second magnetic layer 7 to a third magnetic layer. Then, a through hole may be easily formed after mechanical polishing or chemical-mechanical polishing (CMP).

In order to prevent an effective record track width from being widened, that is to say, in order to avoid a spread of a magnetic flux at one of the poles upon writing, a part of the write gap layer 8 surrounding the pole chip 9 as well as the second magnetic layer 7 constituting one of the poles are etched by means of an ion beam etching such as an ion milling. This condition is shown in FIG. 5, and this structure is called a trim structure. This part of the second magnetic layer 7 serves as the pole portion.

Figure 6A:
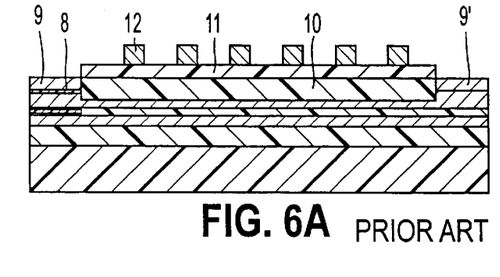
Figure 6B:
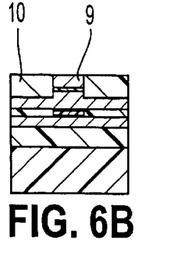

Next, as illustrated in FIG. 6, an insulating layer, e.g. alumina layer 10 is formed with a thickness of about 3 µm, and then an assembly is flattened by CMP.

After that, after forming an electrically insulating photoresist layer 11 into a given pattern by means of the highly precise mask alignment, a first layer thin film coil 12 made of, for instance a copper is formed on the photoresist layer 11.

Figure 7A:
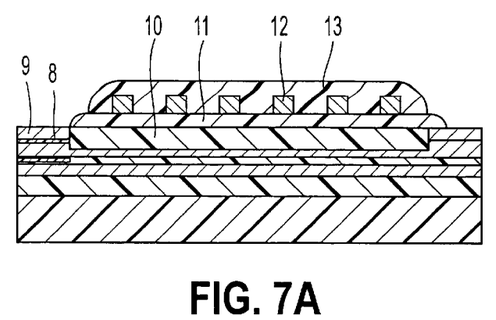
Figure 7B:
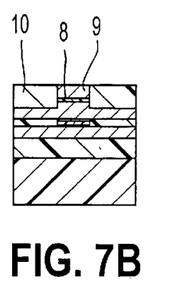

Continuously, as shown in FIG. 7, after forming an electrically insulating photoresist layer 13 on the thin film coil 12 by the highly precise mask alignment, the photoresist layer is sintered at a temperature of, for example 250–300° C. to obtain a flat surface.

Figure 8A:
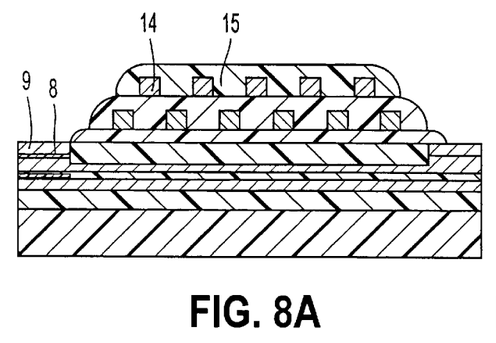
Figure 8B:
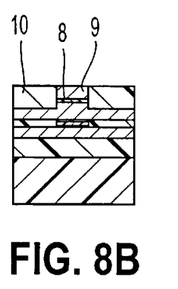

In addition, as shown in FIG. 8, a second layer thin film coil 14 is formed on the flattened surface of the photoresist layer 13. Next, after forming a photoresist layer 15 on the second layer thin film coil 14 with the highly precise mask alignment, the photoresist layer is flattened by baking it at a temperature of, for example 250° C.

As described above, the reason why the photoresist layers 11, 13 and 15 are formed by the highly precise mask alignment process, is that the throat height TH and MR height MRH are defined with reference to a position of the edges of these photoresist layers on the pole portion side.

Figure 9A:
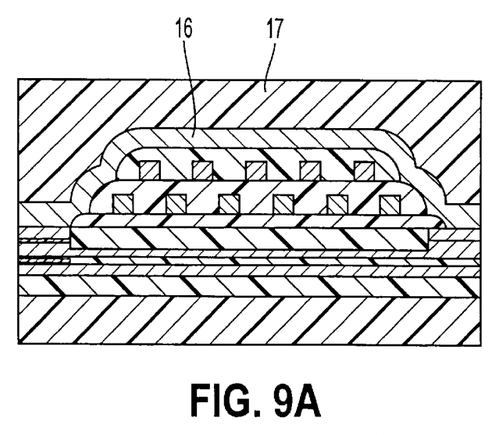
Figure 9B:
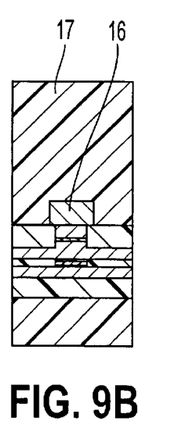

Next, as shown in FIG. 9, a third magnetic layer 16 made of, for example a permalloy and having a thickness of 3 µm is selectively formed on the pole chip 9 and photoresist layers 11, 13 and 15 in accordance with a desired pattern.

This third magnetic layer 16 is brought into contact with the second magnetic layer 7 at a rear position remote from the pole portion via the dummy pattern 9', and the thin film coil 12, 14 passes through a closed magnetic circuit composed of the second magnetic layer, pole chip and third magnetic layer.

Furthermore, an overcoat layer 17 made of alumina is deposited on the exposed surface of the third magnetic layer 16.

Finally, a side on which the magnetoresistive layer 5 and gap layer 8 are formed is polished to form an air bearing surface (ABS) 18.

During the formation of the air bearing surface 18, the magnetoresistive layer 5 is also polished to form a MR reproducing element 19. In this manner, the above mentioned throat height TH and the MR height MRH are determined. In an actual thin film magnetic head, contact pads for performing the electrical connection to the thin film coils 12, 14 and MR reproduction element 19 are formed, but they are not shown in the drawings. FIG. 11 is a cross sectional view cut along a plane parallel with the air bearing surface 18 showing the pole portion of the combination type thin film magnetic film manufactured by the processes explained above.

As shown in FIG. 10, an apex angle θ between a line S connecting side edges of the photoresist layers 11, 13, 15 for isolating the thin film coil 12, 14 and the upper surface of the third magnetic layer 16 is an important factor for determining the performance of the thin film magnetic head together with the above described throat height TH and MR height MRH.

Furthermore, as shown in the plan view of FIG. 12, the width W of the pole chip 9 ad a pole portion 20 of the third magnetic layer 16 is small. Since the width of the track recorded on the magnetic record medium is defined by this width W, it is necessary to narrow this width as small as possible in order to achieve a high surface recording density. It should be noted that in this figure, the thin film coil 12, 14 is represented by concentric circles for the sake of simplicity.

Upon manufacturing the known combination type thin film magnetic head, there is a particular problem in the precise formation of the top pole on a protrusion of the thin film coil covered with the insulating photoresist layer along an inclined surface (Apex) thereof after forming the thin film coil.

In the known manufacturing method, upon forming the third magnetic layer, after forming a magnetic material layer such as a permalloy on the protrusion of the thin film coil having a height of 7–10 µm by plating, a photoresist layer is formed thereon with a thickness of 3–4 µm and then the photoresist layer is shaped into a desired pattern by means of the photolithography.

Here the photoresist layer formed on the protrusion of the thin film coil should have a thickness of at least 3 µm, at a bottom portion of the inclined portion, a thickness of the photoresist layer becomes about 8–10 µm.

The third magnetic layer formed on the protrusion of the thin film coil having a height of about 10 µm as well as on the flat write gap layer has to be patterned such that the pole portion of the third magnetic layer near the edge of the photoresist insulating layers (for instance, 11, 13 in FIG. 7) has a width of about 1 µm in order to realize a narrow track. Therefore, it is necessary to form a pattern having a width of 1 µm in the photoresist layer having a thickness of 8–10 µm.

However, such a fine patterning for forming the pattern having a width of about 1 µm in the thick photoresist layer having a thickness of 8–10 µm is very difficult. Upon exposure in the photolithography, the pattern might be deformed due to the reflection of light and the resolution might be decreased due to the large thickness of the photoresist layer. In this manner, it is particularly difficult to perform the precise patterning for the top pole which should be narrowed for realizing the narrow record track.

In order to mitigate the above mentioned problem, after forming the top pole chip which can be manufactured to have a narrow width and can realize the narrow record track, the third magnetic layer constituting the top pole is formed to be coupled with the top pole chip like as the above explained prior art. That is to say, the above mentioned problem is solved by dividing the magnetic head into the pole chip defining the track width and the third magnetic layer introducing the magnetic flux into the top pole.

However, the thin film magnetic head, particularly writing head has the following problems.

Since the end face of the third magnetic layer 16 is exposed to the air bearing surface 18, the magnetic flux might leak therefrom and an accurate writing operation could not be performed, and therefore the surface recording density could not be improved. In order to solve such a problem, it has been proposed that the end face of the third magnetic layer 16 is retarded inwardly from the air bearing surface 18. However, in this case, a contact area between the pole chip 9 and the third magnetic layer 16 is reduced. Therefore, a magnetic resistance might be increased, and an efficiency of the magnetic head might be decreased.

In order to increase the contact surface between the pole chip 9 and the third magnetic layer 16 for decreasing the magnetic resistance, one may consider that the pole chip is formed to have a large length in a direction perpendicular to the air bearing surface 18. However, in the known thin film magnetic head, since an edge of the pole chip 9 remote from the air bearing surface 18 defines a reference position at which the throat height TH is zero, if the pole chip is formed to have a large length, the throat height zero reference position becomes far from the air bearing surface and it is difficult to set the throat height precisely. In other words, in the conventional thin film magnetic head, the pole chip could not be extended inwardly beyond the throat height zero reference position.

In order to improve the inductive type thin film magnetic head as well as to reduce a size thereof, it is necessary to make the throat height TH as small as possible, and to this end, it is necessary to set the throat height accurately with reference to the throat height zero reference position. In the known combination type thin film magnetic head, the throat height zero reference position could not be sufficiently close to the air bearing surface, and therefore the particularly short throat height could not be realized in a precise manner.

SUMMERY OF THE INVENTION

It is an object of the present invention to provide a thin film magnetic head having a particularly short throat height, in which the above mentioned various problems of the conventional thin film magnetic head can be solved or mitigated, while undesired saturation and leakage of the magnetic flux can be avoided even if the pole portion is miniaturized.

It is another object of the invention to provide a method of manufacturing the thin film magnetic head having a particularly short throat height in an accurate and efficient manner with a higher yield, wherein the saturation and leakage of the magnetic flux can be avoided even if the pole portion is miniaturized.

According to the invention, a thin film magnetic head comprises:
   a substrate;
   a first magnetic layer supported by said substrate and having a recess formed in a surface thereof, said surface being opposite to a surface on which the first magnetic layer is supported;
   an insulating layer formed in said recess formed in said surface opposite to the surface on which the first magnetic layer is supported by the substrate, said insulating layer being co-planar with said surface of the first magnetic layer;
   a write gap layer formed along the co-planer surfaces of the first magnetic layer and insulating layer;
   a second magnetic layer formed along a surface of said write gap layer remote from said substrate such that the second magnetic layer extends from a portion in which said insulating layer is not embedded to a portion in which said insulating layer is embedded;
   a thin film coil formed along a surface of said write gap layer remote from the substrate such that the thin film coil is formed in an electrically isolated and separated manner;
   a third magnetic layer coupled with a portion of a surface of said second magnetic layer remote from said write gap layer and magnetically coupled with said first magnetic layer at a rear portion remote from an air bearing surface; and
   an air bearing surface formed on a basis of a throat height zero reference position which is constituted by an edge of said insulating layer embedded in the recess formed in the first magnetic layer.

In the thin film magnetic head according to the invention, said air bearing surface is formed such that the edge of the insulating layer embedded in the recess formed in the first magnetic layer is used as the throat height zero reference position. Since this throat height zero reference position is not deviated during the manufacturing process, it is possible to obtain precisely a desired throat height according to a designed value. Furthermore, a typical depth of the recess is about 0.5–2.0 μm.

It is preferable that said second magnetic layer is made of a magnetic material having a higher saturation magnetic flux density than said third magnetic layer. When the second magnetic layer constituting the pole chip is made of the magnetic material having a higher saturation magnetic flux density, the saturation of a magnetic flux can be prevented and the writing operation can be performed efficiently. Moreover, since the front end of the third magnetic layer is retarded from the air bearing surface, undesired writing due to the leaked magnetic flux can be avoided. In this case, upon comparing with a case in which both the second and third magnetic layers are made of the magnetic material having a higher saturation magnetic flux density, there is an advantage that the treatment during the manufacturing process can be easy and a manufacturing cost can be reduced.

Furthermore, in the thin film magnetic head according to the invention, since the rear end of the second magnetic layer extends up to a position remote from the air bearing surface than the throat height zero reference position, although the front edge of the third magnetic layer is retarded from the air bearing surface, the second and third magnetic layers can be brought into contact with each other with a larger contact area, and thus the leakage of the magnetic flux can be mitigated.

Moreover, since the throat height zero reference position can be closer to the air bearing surface although the front edge of the third magnetic layer is retarded from the air bearing surface as explained above, the pole portion having a short throat height can be formed precisely. In other words, according to the invention, by extending the second magnetic layer beyond the throat height zero reference position inwardly, it is possible to attain accurately the thin film magnetic head having a very short throat height.

Further, in the thin film magnetic head according to the invention, it is preferable that the recess is formed in the first magnetic layer such that a side wall of the recess is tapered. This taper angle may be preferably 15–90 degrees. By proving the taper in the side wall of the recess, in a small thin film magnetic head having a has a throat height not larger than 0.5 μm, the saturation of the magnetic flux is prevented, and thus the overwrite and NLTS characteristics can be improved.

According to the invention, a method of manufacturing a combination type thin film magnetic head, having at least an inductive type thin film magnetic head supported by a substrate comprises:
   the step of forming a first magnetic layer on a surface of a substrate such that the first magnetic layer extends from an air bearing surface;

the step of forming a recess in a surface of said first magnetic layer such that the recess has an edge which is separated from the air bearing surface by a predetermined distance;

the step of forming an insulating layer in said recess such that a surface of the insulating layer is co-planar with a surface of a part of the first magnetic layer extending from the air bearing surface to said edge of the recess;

the step of forming a write gap layer on co-planar surfaces of said first magnetic layer and insulating layer;

the step of forming a second magnetic layer constituting a pole chip on said write gap layer such that the second magnetic layer extends from the air bearing surface to a position beyond said edge of the recess;

the step of a thin film coil on said write gap layer in an electrically insulated and isolated manner;

the step of forming a third magnetic layer such that the third magnetic layer is connected with a portion of said second magnetic layer retarded from the air bearing surface and is magnetically coupled with said first magnetic layer at a rear portion remote from the air bearing surface; and the step of forming the air bearing surface by polishing.

In the manufacturing method according to the invention, the surface of the insulating layer formed in he recess of the first magnetic layer is formed to be co-planar with the surface of the first magnetic layer, and thus the write gap layer can be formed to be flat and the second magnetic layer formed on the write gap layer can be also flat. They can be formed easily to have desired dimensions and shapes, and the manufacturing yield can be improved.

Furthermore, in the method according to the invention, it is preferable that said second magnetic layer is made of a magnetic material having a higher saturation magnetic flux density than the third magnetic layer. Then, as compared with a case in which both the second and third magnetic layers are made of the magnetic material having a higher saturation magnetic flux density, there is an advantage that the treatment during the manufacturing process can be easy and a manufacturing cost can be reduced.

Moreover, since the throat height zero reference position can be closer to the air bearing surface although the front edge of the third magnetic layer is retarded from the air bearing surface, the pole portion having a short throat height can be manufactured accurately. That is to say, by extending the second magnetic layer beyond the throat height zero reference position inwardly, it is possible to manufacture precisely the thin film magnetic head having a very short throat height.

BRIEF DESCRIPTION OF THE DRAWINGS

FIGS 1A and 1B–10 are cross sectional views showing successive steps of a known method of manufacturing a known combination type thin film magnetic head;

FIGS. 13A and 13B–17A and 17B are cross sectional views illustrating successive steps of the method of manufacturing a first embodiment of the thin film magnetic head according to the invention;

FIGS. 19A and 19B–22A and 22B are cross sectional views depicting successive steps after the step of FIG. 18;

DESCRIPTION OF THE PREFERRED EMBODIMENTS

Now a first embodiment of the method of manufacturing a first embodiment of the thin film magnetic head according to the invention will be explained with reference to FIGS. 13–24. In these drawings, A represents a cross sectional view cut along a plane perpendicular to the air bearing surface and B denotes a cross sectional view of the pole portion cut along a plane parallel with the air bearing surface. In the present embodiment, the thin film magnetic head is constructed as a combination type thin film magnetic head, in which a magnetoresistive type reading thin film magnetic head is formed on a substrate and then an inductive type writing thin film magnetic head is stacked on the magnetoresistive type thin film magnetic head.

Figure 13A:
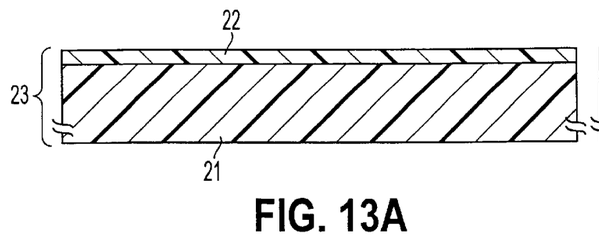
Figure 13B:
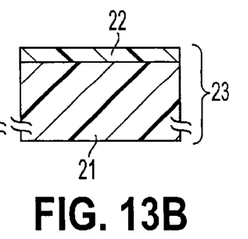

At first, as shown in FIG. 13, an insulating layer 22 made of alumina and having a thickness of about 3–5 $\mu$m is deposited on one surface of a substrate main body 21 made of AlTiC. These substrate main body 21 and insulating layer 22 constitute a substrate or wafer 23. In the present specification, the insulating layer means a layer having at least an electrically insulating property and may or may not have a non-magnetic property. However, in general, materials such as alumina having both the electrically insulating property and the non-magnetic property are used as the insulating layer, and thus the insulating layer and non-magnetic layer are used to denote the same layer.

Figure 14A:
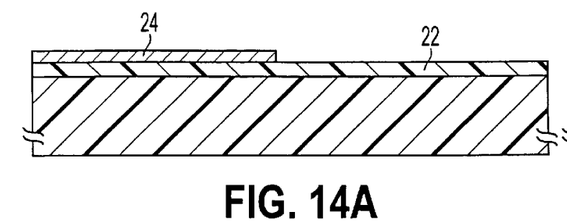
Figure 14B:
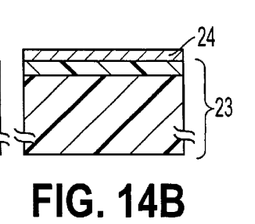

Next, as illustrated in FIG. 14, a bottom shield 24 made of a permalloy for the magnetoresistive type thin film magnetic head is formed on the insulating layer 22 of the substrate 23 with a thickness of about 3 $\mu$m. The bottom shield layer 24 is formed into a desired pattern by means of a plating method using a photoresist mask.

Figure 15A:
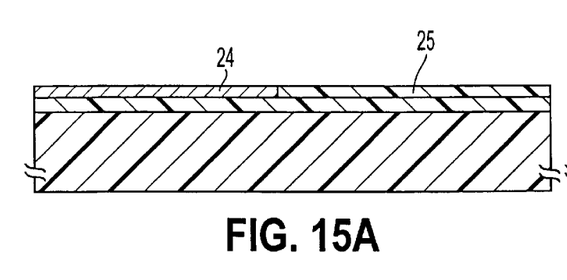
Figure 15B:
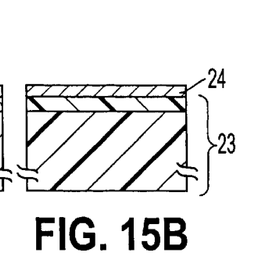

Subsequently, an alumina insulating layer is formed on the bottom shield layer 24 with a thickness of about 4 $\mu$m, and this insulating layer is polished by CMP to obtain an insulating layer 25 having a flat surface as illustrated in FIG. 15.

Figure 16A:
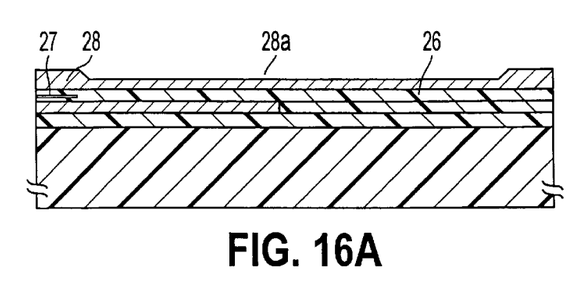
Figure 16B:
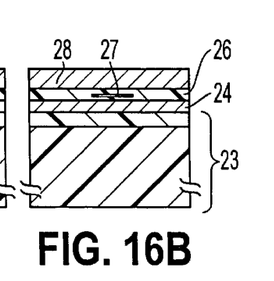

Next, as depicted in FIG. 16, on the flat co-planar surfaces of the bottom shield layer 24 and insulating layer 25, is deposited a GMR layer 27 embedded in a shield gap layer 26 made of alumina. This shield gap layer 26 has a thickness of 0.2 $\mu$m.

Furthermore, as shown in FIG. 16, on the shield gap layer 26 having the GMR layer 27 embedded therein, is formed a first magnetic layer 28 made of a permalloy with a thickness of 3–4 $\mu$m, said first magnetic layer serving as a top shield for the GMR layer and as a bottom pole of the inductive type thin film magnetic head. Then, after forming a photoresist pattern, an ion beam etching using an argon gas is performed while the photoresist pattern is used as a mask, and a recess 28a having a depth of about 0.5–2.0 $\mu$m is formed in a surface of the first magnetic layer 28. In the present embodiment, the recess 28a has a tapered side wall, but according to the invention, the side wall of the recess may be formed upright. That is to say, the side wall of the recess 28a may be formed to be inclined by 15–90 degrees with respect to the surface of the first magnetic layer 28. When the recess 28a is formed to have the taper side wall like as the present embodiment, the saturation of magnetic flux is prevented in a fine thin film magnetic head having the throat height TH not longer than 0.5 μm, and the overwrite characteristic and NLTS characteristic can be improved.

Figure 17A:
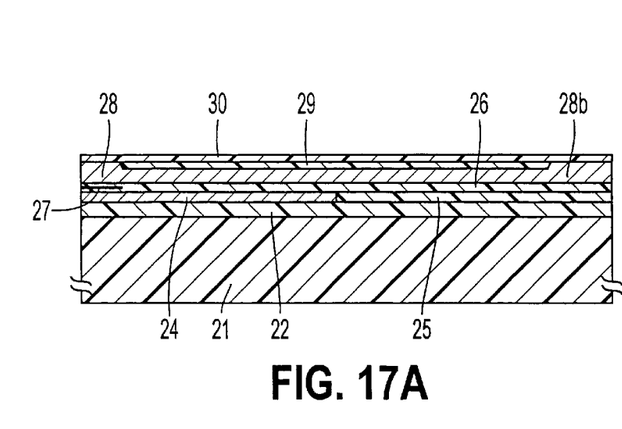
Figure 17B:
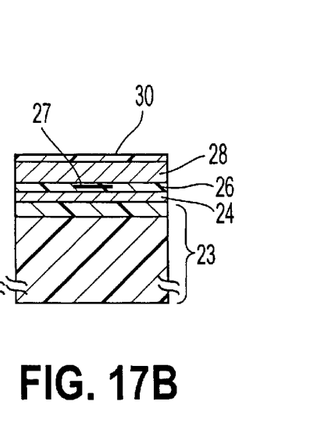

Next, after forming an alumina insulating layer having a thickness of 1–3 μm, the CMP treatment is carried out to form an insulating layer 29 embedded in the above mentioned recess 28a and having a flat surface as depicted in FIG. 17. On the thus flattened surfaces of the first magnetic layer 28 and insulating layer 29, is formed a write gap layer 30 made of an alumina with a thickness of 0.2–0.3 μm. The above CMP treatment is effected such that after the original surface of the first magnetic layer 28 is exposed, an over-etching is conducted over about 0.3–0.5 μm.

Figure 18:
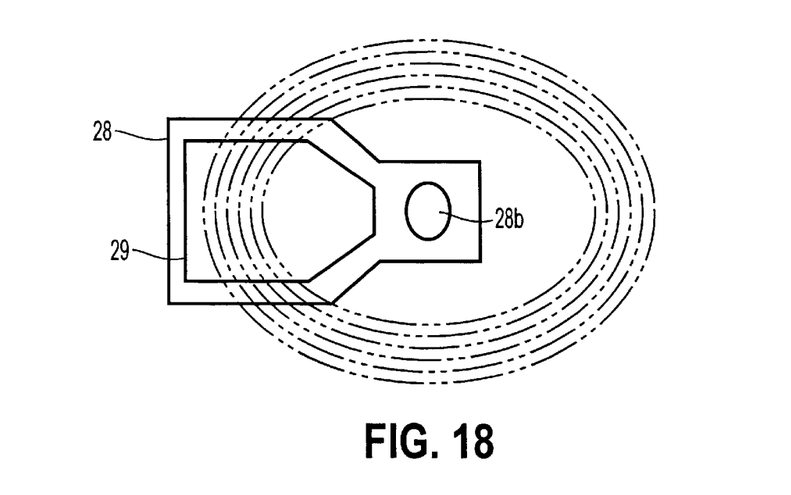
FIG. 18 is a plan view showing the structure in the step of FIG. 17.

FIG. 18 is a plan view showing the structure in which the first magnetic layer 28 is formed in accordance with a desired pattern and the insulating layer 29 is embedded in the surface of the first magnetic layer. It should be noted that in FIG. 18, the write gap layer 30 is omitted and a thin film coil of the inductive type thin film magnetic head is denoted by an imaginary line. Furthermore, in FIG. 18, at a center portion of the thin film coil, there is shown a protrusion 28b formed at a center of the recess 28a, said protrusion 28b serving to connect the bottom yoke constituted by the first magnetic layer 28 with an upper yoke as will be explained later.

In an actual manufacturing process, after forming a number of combination type thin film magnetic heads on the wafer in matrix, the wafer is divided into a plurality of bars, then a bar is polished to form air bearing surfaces, and finally the bar is divided into individual combination type thin film magnetic heads. Therefore, in the preset stage, the end face of the thin film magnetic head does not exist, but for the sake of explanation, the end face is shown in the drawing.

Figure 19A:
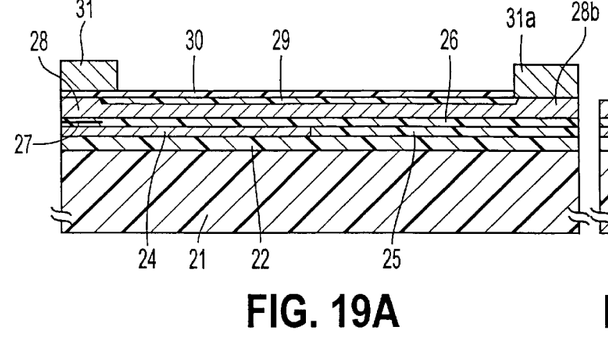
Figure 19B:
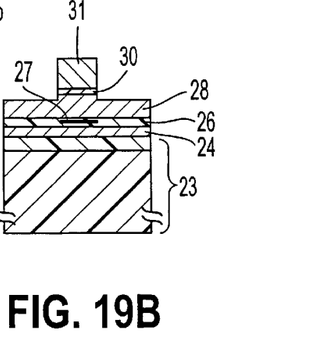

Next, as illustrated in FIG. 19, after selectively removing a portion of the write gap layer 30 situating above the protrusion 28b of the first magnetic layer 28, a second magnetic layer 31 made of a magnetic material having a high saturation magnetic flux density such as NiFe (50%. 50%) and FeN is formed with a thickness of 2–4 μm. The second magnetic layer 31 constitutes the pole chip and may be shaped into a desired pattern by the plating method or by the dry etching after sputtering. Since a width of a record track is defined by a width of the second magnetic layer 31, and therefore the second magnetic layer is formed to have a narrow width such as 0.5–1.2 μm. During the formation of the second magnetic layer 31, a connecting magnetic layer 31a is formed on the protrusion 28b of the first magnetic layer 28.

According to the present invention, the second magnetic layer 31 constituting the pole chip is formed to extend inwardly beyond the edge of the insulating layer 29 opposing to the air bearing surface, said insulating layer being embedded in the recess 28a formed in the first magnetic layer 28. An extended portion of the second magnetic layer beyond the edge may be, for instance 1–3 μm. It should be noted that the edge of the insulating layer 29 opposing to the air bearing surface defines the throat height zero reference position, and therefore according to the invention the second magnetic layer 31 may be expressed to be extended inwardly beyond the throat height zero reference position. A distance from the throat height zero reference position to the air bearing surface is a length of the throat height, and according to the invention this length can be not longer than 1 μm.

Next, as shown in FIG. 19, the write gap layer 30 is selectively removed by the reactive ion etching using a fluoride or chloride gas, while the second magnetic layer 32 is used as a mask, and then an exposed surface of the first magnetic layer 28 is partially removed by the ion beam etching to form the trim structure.

Figure 20A:
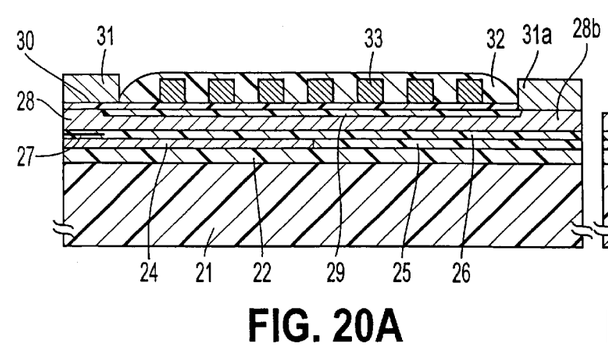
Figure 20B:
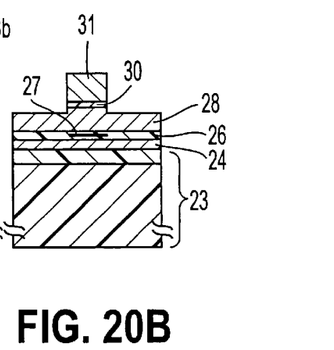
Figure 21A:
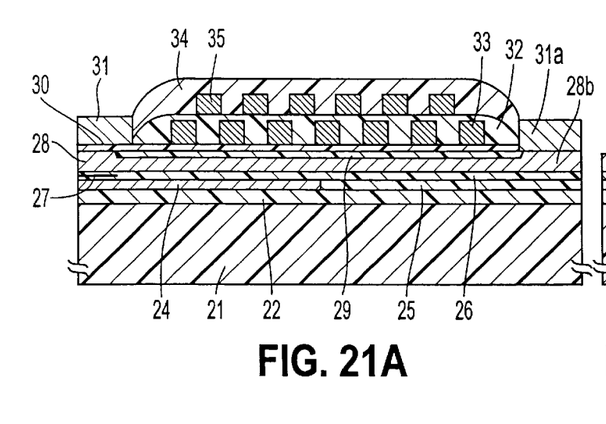
Figure 21B:
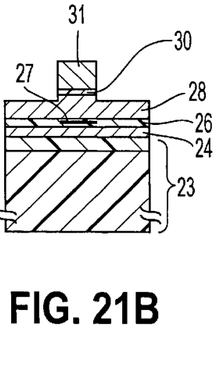

Then, as illustrated in FIG. 20, on the write gap layer 30, is formed a first layer thin film coil 33 such that the thin film coil is supported by an insulating layer 32 in an electrically insulating and isolated manner. Next, as depicted in FIG. 21, a second layer thin film coil 35 is formed such that the thin film coil is supported by an insulating layer 34 in an electrically insulated and isolated manner, and after that the insulating layers are annealed at a temperature of 200–250° C.

Figure 22A:
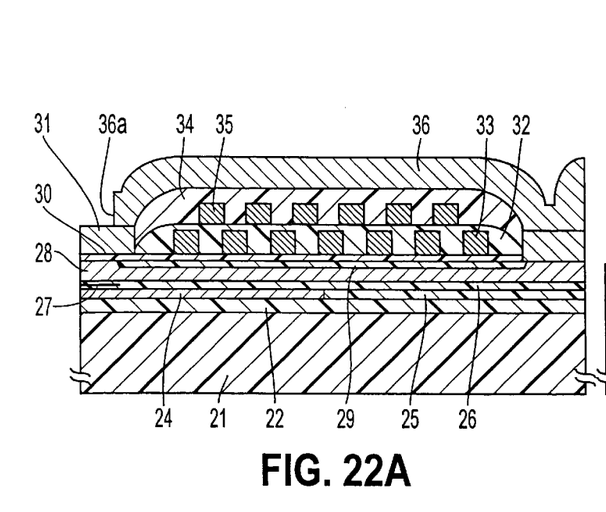
Figure 22B:
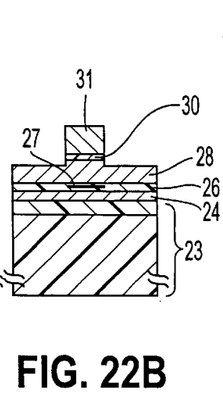

Next, as shown in FIG. 22, a third magnetic layer 36 is formed with a thickness of 3–4 μm. The third magnetic layer 36 may be formed by plating or sputtering a magnetic material having a high saturation magnetic flux density like as the second magnetic layer 31 constituting the pole chip.

Figure 23:
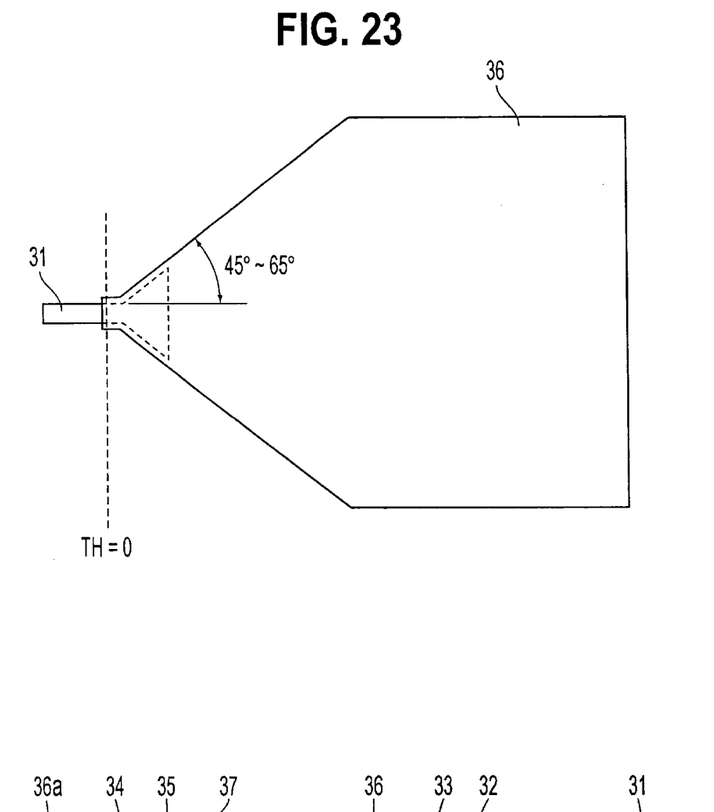
FIG. 23 is a plan view representing the structure in the step shown in FIG. 22.

FIG. 23 is a schematic plan view showing the shape and arrangement of the second magnetic layer 31 and third magnetic layer 36. The second magnetic layer 31 is consisting of a narrow portion constituting the pole portion and an enlarged portion having a large surface area over which the second magnetic layer is brought into contact with the third magnetic layer 36. A portion of the third magnetic layer 36 which is brought into contact with the second magnetic layer 31, is formed into a roof-shape having an apex angle of 90–130°. A tip of the third magnetic layer 36 is narrowed and covers the second magnetic layer 31, and an edge is substantially coincided with the throat height zero reference position. That is to say, the edge of the GMR layer 27 remote from the air bearing surface, the edge of the recess formed in the first magnetic layer 31 opposing to the air bearing surface and the edge of the third magnetic layer 36 opposing to the air bearing surface are aligned in a vicinity of the throat height zero reference position.

Figure 24A:
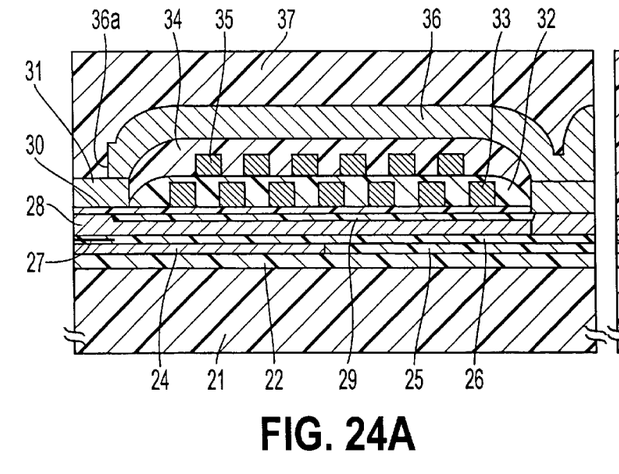
FIGS. 24A and 24B are cross sectional views showing successive steps after the step of FIG. 22.
Figure 24B:
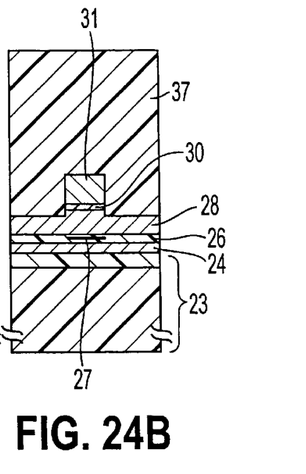

As explained above, according to the present invention, the third magnetic layer 36 is formed such that an edge of a front portion 36a of the third magnetic layer 36 connected with the second magnetic layer 31 is retarded inwardly from the air bearing surface. Even though the front end portion 36a of the third magnetic layer 36 is retarded, a contact area between the second magnetic layer 31 and the third magnetic layer 36 can be sufficiently large to improve the performance of the thin film magnetic head, because the second magnetic layer 31 is extended inwardly beyond the throat height zero reference position. In the present embodiment, in order to further increase the contact surface area between the second magnetic layer 31 and the third magnetic layer 36, the rear portion of the second magnetic layer 31 is shaped into a triangle. Next, as shown in FIG. 24, an overcoat layer 37 made of alumina is formed with a thickness of about 20–30 μm.

Figure 25:
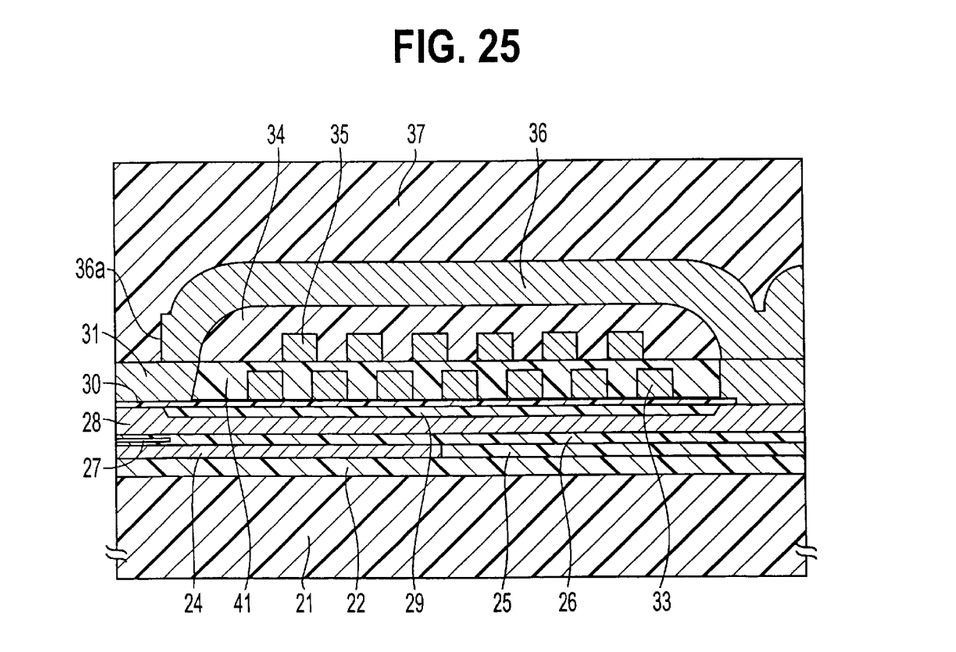
FIG. 25 is a cross sectional view showing a second embodiment of the thin film magnetic head according to the invention.

FIG. 25 is a cross sectional view showing a second embodiment of the thin film magnetic head according to the invention, in which portions similar to those of the previous embodiment are denoted by the same reference numerals used in the previous embodiment and detailed explanation thereof is dispensed with. In the present embodiment, after forming the first layer thin film coil 33 on the write gap layer 30, an inorganic insulating layer 41 made of alumina, silicon oxide and silicon nitride is formed with a thickness of about 5–7 μm and a flat surface is formed by the CMP. Then, on the thus flattened surface, the second layer thin film coil 35 is formed such that the thin film coil is supported by the insulating layer 34 made of a photoresist.

Figure 26:
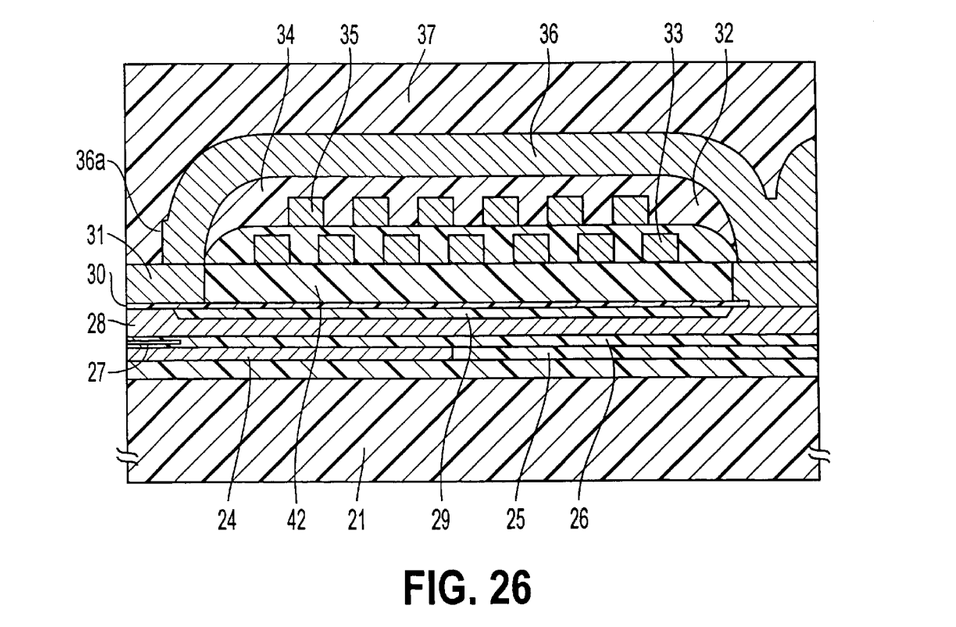
FIG. 26 is a cross sectional view illustrating a third embodiment of the thin film magnetic head according to the invention.

FIG. 26 is a cross sectional view showing a third embodiment of the thin film magnetic head according to the invention. Also in the present embodiment, portions similar to those of the previous embodiments are denoted by the same reference numerals used in the previous embodiments. Also in the present embodiment, the process up to the step of forming selectively the second magnetic layer 31 constituting the pole chip on the write gap layer 30 is identical with that of the previous embodiments. In the present embodiment, after forming an inorganic insulating layer 42 made of alumina, silicon oxide and silicon nitride on the write gap layer 30 with a thickness of about 5–7 μm, a surface is flattened by the CMP. Then, the first layer thin film coil 33 supported by the photoresist insulating layer 32 is formed and the second thin film coil 35 is formed such that the coil is supported by the photoresist insulating layer 34.

In an alternative embodiment of the this embodiment, the insulating layer supporting the first layer thin film coil in an insulating and isolating manner may be formed by an inorganic insulating layer.

The present invention is not limited to the embodiments explained above, but many alternations and modifications can be conceived by a person skilled in the art within the scope of the invention. For instance, in the above explained embodiments, the magnetoresistive type reading thin film magnetic head is provided on the substrate and then the inductive type writing thin film magnetic head is stacked thereon, but according to the invention, a stacking order of these thin film magnetic heads may be reversed. Moreover, in the above embodiments, the magnetoresistive element is formed by the GMR element, but it may be formed by the AMR element.

Furthermore, according to the invention, the reading thin film magnetic head may be constructed by any other type of reading thin film magnetic head than the magnetoresistive type thin film magnetic head. Further, it is not always necessary to provide the reading thin film magnetic head, but only the inductive type writing thin film magnetic head may be provided.

In the above embodiments, the third magnetic layer 36 includes the narrow portion at its front end, but such a narrow portion may be dispensed with. Also in such a case, the front end face of the third magnetic layer 36 may be positioned in a vicinity of the throat height zero reference position.

In the thin film magnetic head and the method of manufacturing the same according to the invention, the performance and manufacturing yield can be improved due to the following reason. Since the second magnetic layer constituting the pole chip is formed on the flat surface, its width can be very narrowed such as 0.5–1.2 μm, and since the second magnetic layer is made a magnetic material having a high saturation magnetic flux density, the magnetic flux induced by the thin film coil could not be saturated at the pole chip and can effectively arrive at a recording site with a small loss.

Since the second magnetic layer constituting the pole chip extends inwardly beyond the throat height zero reference position, it is possible to attain a large contact surface area between the second and third magnetic layers even if the front end of the third magnetic layer is retarded from the air bearing surface. Therefore, the leakage of the magnetic flux from the front end of the third magnetic layer can be effectively prevented and a sufficiently large amount of magnetic flux can be flown into the second magnetic layer, and thus an accurate recording operation can be performed in an efficient manner.

Moreover, since the throat height zero reference position can be nearer to the air bearing surface than the rear end of the second magnetic layer constituting the pole chip as stated above, a short throat height can be formed precisely and the magnetic property can be improved. Further, the throat height zero reference position is defined by the edge of the recess formed in the first magnetic layer and having the insulating layer embedded therein opposing to the air bearing surface, and since the position of the edge of the recess could be hardly deviated during the manufacturing process and is closer to the air bearing surface, a number of chips formed in the wafer can be formed such that their throat heights of sub-micron order can be accurately controlled, and therefore the manufacturing yield can be improved very much.

Moreover, since the throat height zero reference position can be nearer to the air bearing surface than the rear end of the second magnetic layer constituting the pole chip as stated above, a short throat height can be formed precisely and the magnetic property can be improved. Further, the throat height zero reference position is defined by the edge of the recess formed in the first magnetic layer and having the insulating layer embedded therein opposing to the air bearing surface, and since the position of the edge of the recess could be hardly deviated during the manufacturing process and is closer to the air bearing surface, a number of chips formed in the wafer can be formed such that their throat heights of sub-micron order can be accurately controlled, and therefore the manufacturing yield can be improved very much.

Furthermore, the above mentioned recess is preferably formed to have the tapered side wall like as the above embodiments although the recess may be formed to have an upright side wall by means of an ion milling from a direction perpendicular to the substrate surface. Particularly, when the tapered side wall is formed, the saturation of magnetic flux can be avoided particularly in the thin film magnetic head having a very short throat height TH not longer than 0.5 μm, and therefore the over-write characteristic and NLTS characteristic can be improved.

Moreover, since the throat height zero reference position can be nearer to the air bearing surface than the rear end of the second magnetic layer constituting the pole chip as stated above, a short throat height can be formed precisely and the magnetic property can be improved. Further, the throat height zero reference position is defined by the edge of the recess formed in the first magnetic layer and having the insulating layer embedded therein opposing to the air bearing surface, and since the position of the edge of the recess could be hardly deviated during the manufacturing process and is closer to the air bearing surface, a number of chips formed in the wafer can be formed such that their throat heights of sub-micron order can be accurately controlled, and therefore the manufacturing yield can be improved very much.

What is claimed is:

1. A method of manufacturing a combination type thin film magnetic head having at least an inductive type thin film magnetic head supported by a substrate comprising:

the step of forming a first magnetic layer on a surface of a substrate such that the first magnetic layer extends from an air bearing surface;

the step of forming a recess in a surface of said first magnetic layer such that the recess has an edge which is separated from the air bearing surface by a predetermined distance;

the step of forming an insulating layer in said recess such that a surface of the insulating layer is co-planar with a surface of a part of the first magnetic layer extending from the air bearing surface to said edge of the recess;

the step of forming a write gap layer on co-planar surfaces of said first magnetic layer and insulating layer;

the step of forming a second magnetic layer constituting a pole chip on said write gap layer such that the second magnetic layer extends from the air bearing surface to a position beyond said edge of the recess;

the step of a thin film coil on said write gap layer in an electrically insulated and isolated manner;

the step of forming a third magnetic layer such that the third magnetic layer is connected with a portion of said second magnetic layer retarded from the air bearing surface and is magnetically coupled with said first magnetic layer at a rear portion remote from the air bearing surface; and the step of forming the air bearing surface by polishing.

2. A method of manufacturing a thin film magnetic head as claimed in claim 1, wherein said recess is formed in the surface of said first magnetic layer such that the recess has a tapered side wall.

3. A method of manufacturing a thin film magnetic head as claimed in claim 2, wherein said recess is formed in the surface of the first magnetic layer such that the recess has the tapered side wall with a taper angle of about 15–90 degrees.

4. A method of manufacturing a thin film magnetic head according to claim 3, wherein said recess is formed by an ion beam etching using a photoresist mask formed on the surface of said first magnetic layer such that the recess has a depth of about 0.5–2.0 µm.

5. A method of manufacturing a thin film magnetic head as claimed in claim 1, wherein said thin film coil is formed by at least two thin film coils, a first layer thin film coil is formed to be supported by an inorganic insulating layer, and a second layer thin film coil is formed on the inorganic insulating layer to be supported by an organic insulating layer.

6. A method of manufacturing a thin film magnetic head as claimed in claim 1, wherein prior to the formation of said thin film coil on said write gap layer, an inorganic insulating layer is formed on the write gap layer, and after flattening a surface of said inorganic insulating layer, said thin film coil is formed on said surface of the inorganic insulating layer to be supported by an organic insulating layer.

7. A method of manufacturing a thin film magnetic head as claimed in claim 1, wherein a first layer thin film coil of said thin film coil is formed on the write gap layer such that the first layer thin film coil is supported by an inorganic insulating layer, and after flattening a surface of the inorganic insulating layer, a second layer thin film coil is formed on the inorganic insulating layer such that the second layer thin film coil is supported by an inorganic insulating layer.

8. A method of manufacturing a thin film magnetic head according to claim 1, wherein said step of forming the air bearing surface by polishing is carried out while an edge of said recess is used as a throat height zero reference position.

9. A method of manufacturing a thin film magnetic head according to claim 1, wherein after forming said second magnetic layer, a trim structure is formed by partially etching said write gap layer and first magnetic layer while a pole portion of the second magnetic layer is used as a mask.

10. A method of manufacturing a thin film magnetic head according to claim 1, wherein prior to the formation of said inductive type thin film magnetic head, a magnetoresistive type thin film magnetic head is formed on said substrate to constitute a combination type thin film magnetic head.

11. A method of manufacturing a thin film magnetic head according to claim 10, wherein a fourth magnetic layer constituting one of magnetic shields for said magnetoresistive type thin film magnetic head is formed on said substrate, a magnetoresistive layer embedded in a shield gap layer is formed on said fourth magnetic layer, and said first magnetic layer is formed on said shield gap layer such that the first magnetic layer constitutes the other magnetic shield for the magnetoresistive type thin film magnetic head as well as one of poles of the inductive type thin film magnetic head.

* * * * *